United States Patent [19]

Minegishi

[11] 3,738,668
[45] June 12, 1973

[54] OIL SCRAPING PISTON RING
[75] Inventor: Hiroshi Minegishi, Kawagoe, Japan
[73] Assignee: Nippon Piston Ring Co., Ltd., Tokyo, Japan
[22] Filed: Dec. 29, 1970
[21] Appl. No.: 102,491

[30] Foreign Application Priority Data
Dec. 29, 1969 Japan..........................45/1545

[52] U.S. Cl................................. 277/141, 267/1.5
[51] Int. Cl............................................... F16j 9/06
[58] Field of Search .................. 277/139, 140, 141,
277/187, 160; 267/1.5; 29/156.6, 156.61,
156.62, 156.63

[56] References Cited
UNITED STATES PATENTS
2,670,256  2/1954  Hsia-si Pien ......................... 277/139
3,353,830  11/1967  Bell..................... 277/139
2,058,143  10/1936  Flanders ............................ 277/187

Primary Examiner—Samuel B. Rothberg
Assistant Examiner—Robert I. Smith
Attorney—Sughrue, Rothwell, Mion, Zinn & Macpeak

[57] ABSTRACT

An oil scraping piston ring which has a steel sheet strip having opposite projections formed longitudinally at one side thereof and projecting flatly at both sides and also having a plurality of slots formed equidistantly from each other at the same side and having the same shape. A plurality of slots are equidistantly formed at the other side of said ring and alternatively with respect to the opposing slots, and also having a plurality of curved edges which are alternatively bent in opposite directions. This piston ring is to be inserted into a piston groove for scraping oil and for readily removing to pass the oil.

1 Claim, 5 Drawing Figures

3,738,668
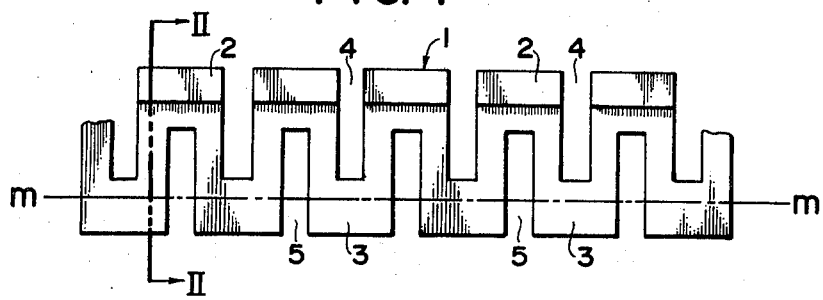
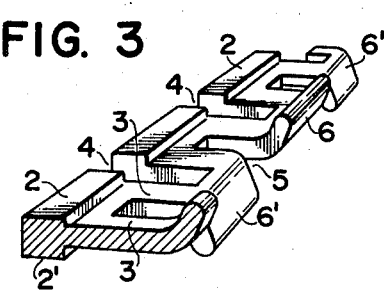
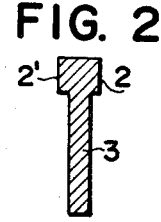
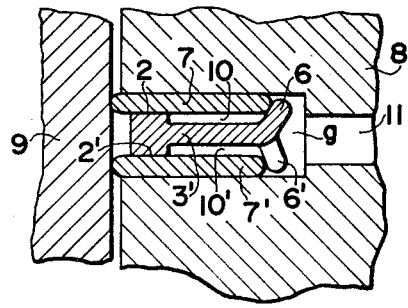
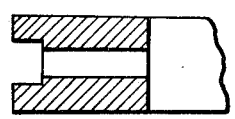
INVENTOR
HIROSHI MINEGISHI
BY Sughrue, Rothwell, Mion, Zinn & Macpeak
ATTORNEYS 3,738,668

OIL SCRAPING PISTON RING

BACKGROUND OF THE INVENTION

1. Field of the Invention

This invention relates to an oil scraping piston ring for a piston of an internal combustion engine, and more particularly to an oil scraping ring adapted for obtaining good oil scraping of the piston and having high tensile strength upon insertion into the piston groove and placing the piston in the engine.

1. Description of the Prior Art

The conventional channel type of piston ring known as a high strength, high followability piston ring cannot be used for small diameter pistons having piston ring grooves which are narrow in axial width, for example, less than 3.5 mm, because of its small size. For this reason, cast iron oil scraping rings are used for such types of pistons. Consequently, the ring does not have enough strength, due to its narrow axial width, thus causing insufficient followability. Since this type of ring was complemented by using expensive high strength material, it is not economical. In addition, several oil windows formed in the piston ring must be reduced in size and number due to the weakness of the ring at the point of strength of the material, thereby causing worse oil passing characteristics.

SUMMARY OF THE INVENTION

This invention contemplates elimination of the aforementioned disadvantages of the conventional oil scraping piston ring of small diameters and provision of a novel and improved oil scraping piston ring which may have high tensile strength and good oil passing characteristics.

It is one object of the present invention to provide an oil scraping piston ring which is small and strong enough for small diameter pistons of compact engines.

According to one aspect of the present invention, there is provided an oil scraping ring which comprises a steel sheet strip having opposite projections formed longitudinally on one side thereof and projecting flatly on both sides and also having a plurality of slots equidistantly formed on the same side in the same shape and also having a plurality of slots equidistantly formed at the other side and alternatively with respect to the opposite slots and having a plurality of curved edges alternatively bent in opposite directions.

The other objects, features and advantages of the present invention will become apparent from the following description taken in conjunction with the accompanying drawings, in which:

BRIEF DESCRIPTION OF THE DRAWINGS

FIG. 1 is a plan view of the original material formed and cut with slots for manufacturing the oil scraping piston ring of this invention;

FIG. 2 is a longitudinal sectional view of the material shown in FIG. 1 taken along the line II—II therein;

FIG. 3 is a perspective view of part of the oil scraping piston ring of this invention;

FIG. 4 is a partial transverse sectional view of the oil scraping piston ring which is inserted into the piston groove; and FIG. 5 is a transverse side sectional view of part of the conventional cast iron oil scraping piston ring used for the same purpose as this invention.

DESCRIPTION OF THE PREFERRED EMBODIMENT

Reference is now made to the drawings, which show one embodiment of the present invention, and particularly to FIG. 1, which shows the original material formed and cut with slots for manufacturing the oil scraping piston ring of this invention. A steel sheet strip 1 has opposite projections 2 and 2' formed longitudinally on one side thereof and projecting flatly from both sides above and below the sheet, and also includes a flat portion 3 shown in FIGS. 1 and 2 so that a T-shape cross-section is formed. The longitudinally projecting side of the sheet strip 1 is formed to have a plurality of slots 4 formed equidistantly from each other and in the same shape, such as a rectangular shape. The other flat side of the sheet strip 1 is also formed or cut to have a plurality of slots 5 formed equidistantly from each other and alternatively with respect to the opposite projected side of slots 4. The flat edge 3 of the sheet strip 1 is bent alternatively in opposite directions such as in an upward and downward direction at a predetermined line $m-m$ shown in FIG. 1 so that the respective edges of the flat portion 3 of the sheet strip 1 are alternatively bent upwardly and downwardly at approximately 90 degrees to form curved projections or edges 6 and 6'. The thus formed strip 1 is bent into a circular shape having a gap at one portion so that the bent projections or edges are disposed inside of the circle as shown in FIG. 3 to form an expander. This expander is inserted into a piston ring groove g of a piston 8 as shown in FIG. 4, together with upper and lower thin rings 7 and 7' placed above and beneath the expander in combination therewith.

In operation of the thus constructed expander inserted into the piston ring groove g, the bent edges or projections 6 and 6' urge the flat circular rings 7 and 7' peripherally outwardly. Accordingly, when this expander is inserted into the piston ring groove of the piston inserted into a cylinder 9, the flat rings 7 and 7' are so urged by the bent edges 6 and 6' of the expander in a radially outward direction as to closely contact the inner wall of the cylinder 9 to properly scrape the oil therefrom. The scraped oil is then removed through a plurality of oil passages or gaps 10 and 104 to flow through the oil holes 11 formed in the piston.

If the material of the expander is made of high strength material, such as 17–7PH stainless steel, the mechanical strength of the expander is increased to improve the resiliency of the expander itself. This eliminates problems caused by an accidental defect in the scraping piston ring and raises the surface pressure of the flat rings against the inner surface of the cylinder 9. If chromium is plated onto the scraping ring, the contacting portions of the ring hardly wear and lessen the oil flowing resistance to improve the oil passing characteristics of the scraping ring.

It should be understood from the foregoing description that since the oil scraping piston ring has a smaller axial width with flat small projections 2 and 2' combined with the flat rings 7 and 7' above and beneath the ring 1, a small axial width oil scraping piston ring adapted for compact engines is provided. Thus, the scraping piston ring according to the present invention will have enough strength even when used with pistons smaller than 3.5 mm in axial width in comparison with the conventional cast iron piston ring.

It should also be understood that the oil scraping piston ring of this invention is formed integrally by bending at one side only longitudinally along the strip, and accordingly it provides very high tensile strength to properly scrape the oil and to smoothly pass the oil through the gap formed between the piston ring and flat rings into the oil hole.

It should also be understood that since the scraping piston ring of this invention is simple in structure and manufacture, it may be produced in mass production by a less expensive process.

I claim:

1. A piston ring assembly for an internal combustion engine comprising a pair of flat annular rings and an expander member disposed intermediate said ring, said expander member comprising a flat annular washer-type steel strip having a radial dimension greater than the axial dimension and flat projections protruding from opposite surfaces of said strip along one edge thereof, a plurality of first transverse slots extending into said strip from said one edge and a plurality of second transverse slots extending into said strip from the other edge thereof alternately with respect to said first slot, adjacent portions of said other edge being bent in opposite directions into engagement with the radial inner edges of said flat annular rings to force said rings in a radially outward direction while permitting oil to flow between said rings.

* * * * *